US012609234B2

(12) United States Patent
Kern et al.

(10) Patent No.: US 12,609,234 B2
(45) Date of Patent: Apr. 21, 2026

(54) PLANAR TRANSFORMER

(71) Applicant: L3Harris Technologies, Inc., Melbourne, FL (US)

(72) Inventors: Paul Kern, Loveland, OH (US); Justin Graves, Middletown, OH (US); Josh Basler, Cincinnati, OH (US); Nathan Blake, Miamisburg, OH (US); Dung Nguyen, Cincinnati, OH (US)

(73) Assignee: L3Harris Technologies, Inc., Melbourne, FL (US)

( * ) Notice: Subject to any disclaimer, the term of this patent is extended or adjusted under 35 U.S.C. 154(b) by 694 days.

(21) Appl. No.: 18/086,136

(22) Filed: Dec. 21, 2022

(65) Prior Publication Data

US 2024/0212913 A1 Jun. 27, 2024

(51) Int. Cl.

| | |
|---|---|
| ***H01F 5/00*** | (2006.01) |
| ***H01F 27/24*** | (2006.01) |
| ***H01F 27/28*** | (2006.01) |
| ***H01F 41/04*** | (2006.01) |

(52) U.S. Cl.
CPC ......... *H01F 27/2804* (2013.01); *H01F 27/24* (2013.01); *H01F 41/041* (2013.01); *H01F 2027/2809* (2013.01)

(58) Field of Classification Search
CPC .................................................. H01F 27/2804
USPC .......................................................... 336/200
See application file for complete search history.

(56) References Cited

U.S. PATENT DOCUMENTS

| | | | | |
|---|---|---|---|---|
| 6,069,548 | A * | 5/2000 | Baarman ................ | H05K 1/182 336/200 |
| 7,746,208 | B2 | 6/2010 | Loef et al. | |
| 7,865,238 | B2 | 1/2011 | Brink | |
| 9,576,717 | B2 | 2/2017 | Persson et al. | |
| 9,607,759 | B2 | 3/2017 | Boone et al. | |
| 2007/0290784 | A1 | 12/2007 | Nesse et al. | |
| 2015/0302972 | A1* | 10/2015 | Yonezawa ........... | H01F 27/2804 336/200 |

OTHER PUBLICATIONS

Product Sheet, "F08 Flexible Adhesive", multi-seals.com, Form: MK-058 Rev. B, Oct. 15, 2015, 1 page.

* cited by examiner

*Primary Examiner* — Ronald Hinson
(74) *Attorney, Agent, or Firm* — Edell, Shapiro & Finnan, LLC

(57) ABSTRACT

A planar transformer including first and second parts of a core with least one of the first and second parts having a center post that resides in an aperture of a PWB. The PWB includes primary windings and secondary windings that surround the center post, are magnetically coupled by the core, and are electrically independent. Separating an uppermost winding from the first part of the core is a first prepreg structure and separating a lowermost winding from the second part of the core is a second prepreg structure. There being no windings disposed between the first and second prepreg structures and the core. This planar transformer structure inhibits the windings from electrically shorting through the core when the planar transformer is subjected to shock or vibration. One variant includes the use of pre-form adhesives sheets located between the solder mask layers of the PWB and the core that further inhibit the windings from shorting through the core.

1 Claim, 10 Drawing Sheets

PLANAR TRANSFORMER

FIELD

The present invention relates to a planar transformer.

BACKGROUND

A transformer is an electromagnetic device that transfers energy between a primary winding and at least one secondary winding. Transformers are commonly used to increase or decrease the voltage of an AC (alternating current) signal. A planar transformer is a transformer that uses flat windings, usually on a printed wiring board (PWB), instead of copper wire to form the coils. The PWB construction creates a different form factor that allows for a low profile transformer. The PWB windings are very repeatable, which makes the parasitic effects such as leakage inductance and interwinding capacitance more predictable and repeatable than standard wire-wound construction.

In military and aeronautic applications, planar transformers are often subjected to high g-force shock and vibration that can cause the core to move, rub, or strike against the outer-most layers of the PWB. Shocks can approach 100,000 gs in some military applications, which can break transformers of normal construction. High shock and vibration applications present a risk of one or more of the windings electrically shorting through the electrically conductive core material. What is needed is a planar transformer that mitigates this risk.

SUMMARY

According to one implementation, a planar transformer is provided that includes a ferromagnetic core comprising a first part and a second part, with at least one of the first and second parts having a center post that extends into an aperture of a multilayer PWB. The PWB includes electrically independent primary and secondary windings surrounding the aperture that are magnetically coupled by the core. The planar transformer may include a single primary winding and a single secondary winding or may otherwise include multiple primary and secondary windings that may be fully interleaved. Adjacent windings are separated by at least one dielectric substrate to prevent a short circuit between them.

The first and second parts of the core respectively have bottom and top surfaces that respectively face towards the top and bottom surfaces of the PWB. According to one implementation, the manufacture of the planar transformer includes inserting a first, pre-shaped and non-electrically conductive adhesive (referred to hereinafter as a "first pre-form adhesive sheet") between the bottom surface of the first part of the core and the top side of the PWB, and inserting a second, pre-shaped and non-electrically conductive adhesive (referred to hereinafter as a "second pre-form adhesive sheet") between the top surface of the second part of the core and the top side of the PWB. When heated, the first and second pre-form adhesive sheets become viscous to respectively effectuate a bonding between the first and second parts of the core and the top and bottom surfaces of the PWB, while filling any gaps existing between the core and the PWB. During a curing of the pre-form adhesive sheets they beneficially become rigid with little to no flexibility, having a hardness in the Shore D hardness scale at a temperature of 70 degrees Fahrenheit. According to one implementation, the thickness of the first and second pre-form adhesive sheets before being heated is between 0.017 to 0.027 inches and ultimately assumes a thickness of 0.003 to 0.026 inches upon the adhesive being cured. According to some implementations, the adhesive is a thermoset epoxy having properties that prevent or inhibit the core from making contact with the PWB, or in any event, to prevent the core from making contact with any of the transformer windings when the transformer is subjected to high g-force shocks and/or vibrations.

According to some implementations, each of the top and bottom sides of the multilayer PWB comprises a solder mask layer onto which the respective first and second cured adhesive preforms are bonded. The solder mask layers may have a thickness of 0.0005 to 0.0015 inches. In some instances, the solder mask at the top side of the PWB has on it printed indicia produced by a silkscreen process.

When each of the top and bottom sides of the PWB comprises a solder mask, according to one implementation, each of the solder masks includes one or more recesses that at least partially restrict the first and second pre-form adhesive sheets from respectively flowing out from under the first and second parts of the core when the adhesive pre-forms are heated to assume a viscous state. This advantageously maintains the adhesive in a region directly under the core parts so that a desired thickness of the adhesive is achieved. This also contributes to enhancing the repeatability of the manufacturing process. According to some implementations the recesses are about 0.020 to 0.040 inches wide and extend partially or entirely through the thickness of the solder masks.

According to other implementations, in conjunction with using the afore-disclosed pre-form adhesives to inhibit or prevent a shorting of the windings through the core, the PWB itself may be manufactured to include one or more layers that are configured to achieve the same. These one or more layers are sometimes referred to herein as "anti-abrasion substrates" and may comprise one or more epoxy-infused fiberglass sheets.

These and other advantages and features become apparent in view of the figures and the detailed description.

DETAILED DESCRIPTION

Figure 1:
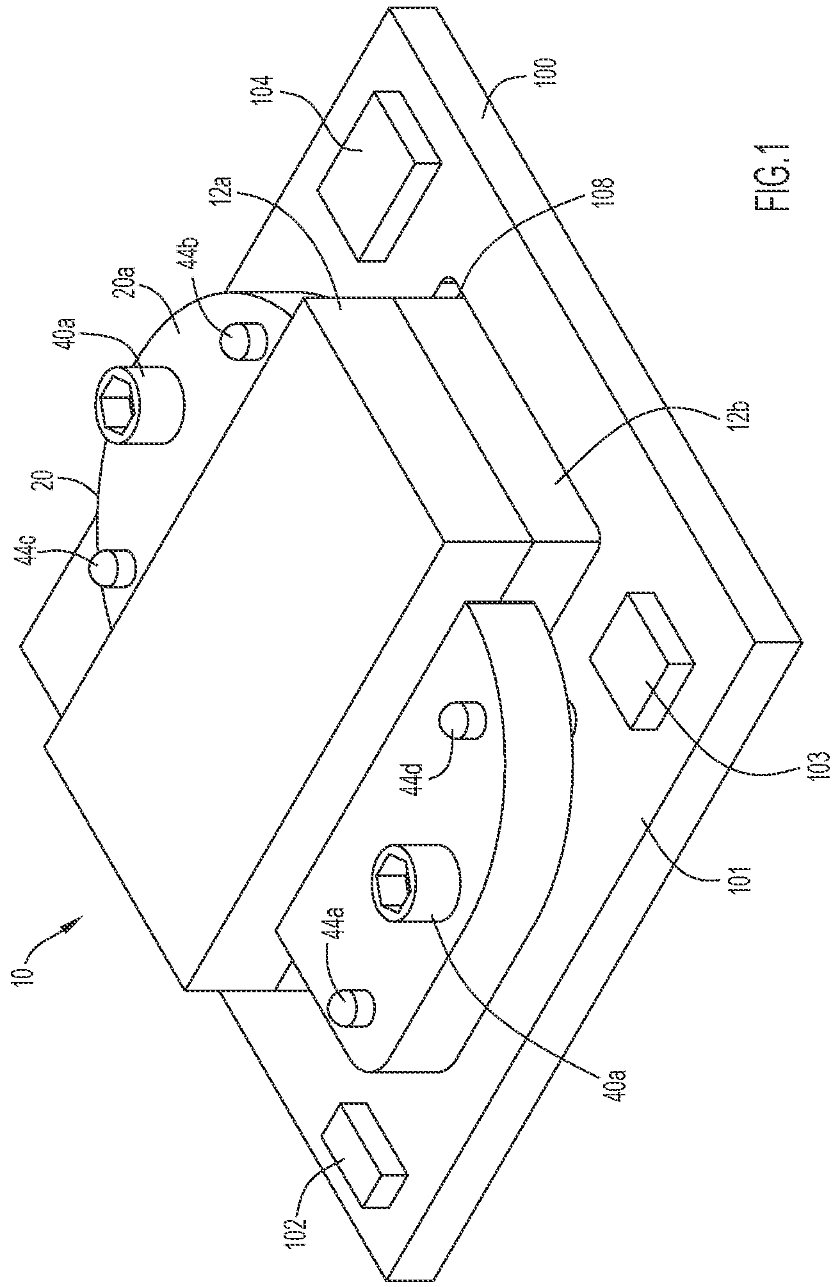
FIG. 1 is a perspective view of a planar transformer according to one implementation with the planar transformer being electrically and mechanically connected to another, separate circuit board.

The terms "top", "bottom", "upper", "lower", "under" and "beneath" as used herein are in reference to the orientation of the planar transformers and the product printed wiring boards shown in the accompanying figures. As is readily apparent to those skilled in the art, in use the planar transformer and the electronics board to which it is attached or integrated may assume any orientation. As such, "top", "bottom", upper", "lower" "under" and "beneath" as used herein serve as only a reference in describing relative positions of the component parts as they appear in the accompanying drawings and are not intended to limit the scope of the invention to any specific orientation of the planar transformer or of the main circuit board the transformer is connected to. This written description and the appending claims is meant to cover any orientation of the planar transformer and not only those as depicted in the accompanying drawings. Furthermore, it is important to note that the elements/components depicted in the drawings are not drawn to scale.

In the implementations hereinafter disclosed, the use of "prepreg" structures are used in the construction of a planar transformer PWB to provide a barrier between the top-most and bottom-most windings in the PWB and the core. "Prepreg" as used herein refers to a reinforcing or molding material (such as paper or glass cloth) already impregnated with a synthetic resin (typically epoxy). Epoxy resins, also known as polyepoxides, are a class of reactive prepolymers and polymers which contain epoxide groups.

Figure 2:
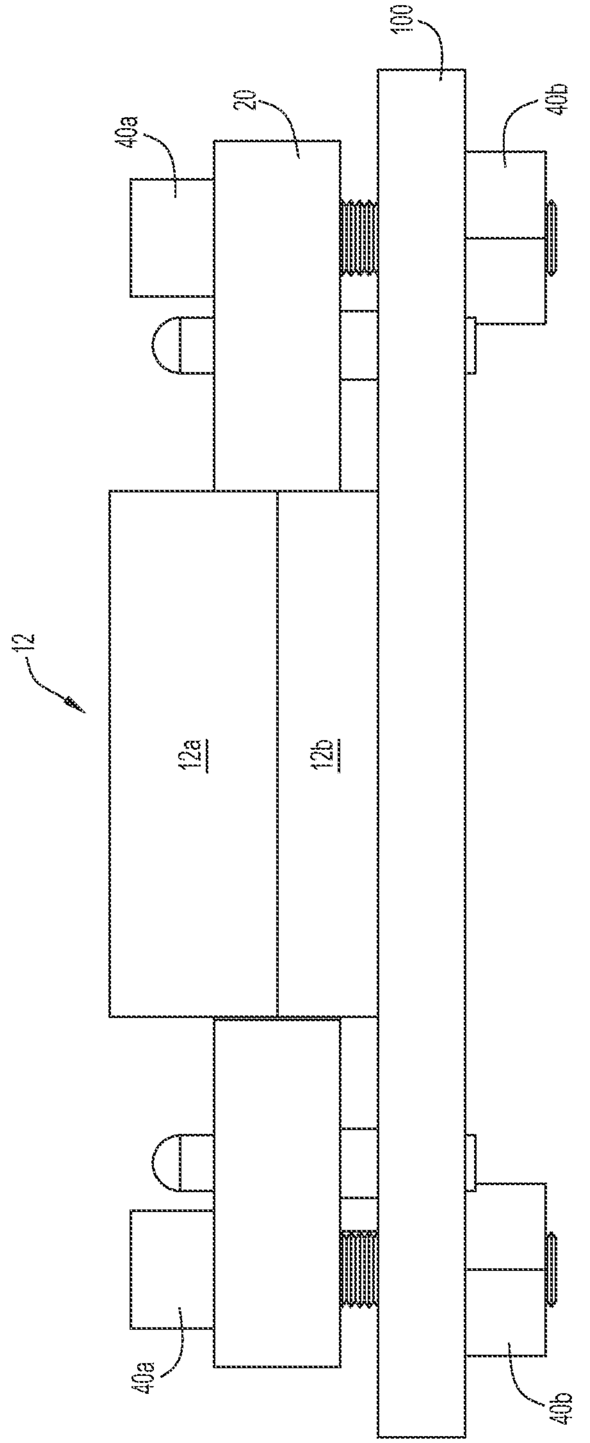
FIG. 2 is a side view of the planar transformer of FIG. 1.
Figure 3:
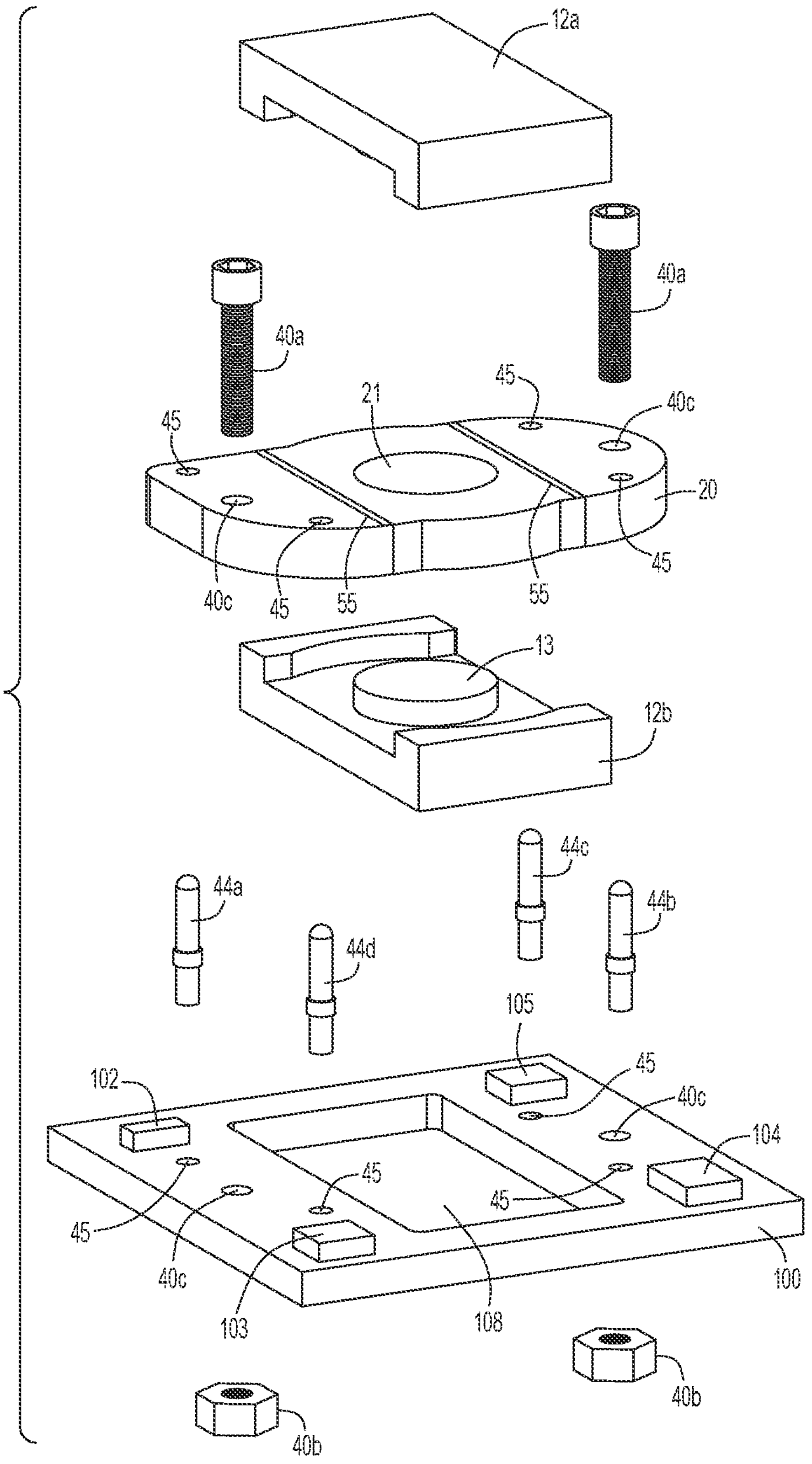
FIG. 3 is an exploded view of the assembly of FIGS. 1 and 2.

FIGS. 1-3 shows a perspective view of a planar transformer 10 mechanically and electrically connected to circuit board 100. According to some implementations, the circuit board 100 is a printed wiring board having electrical components 102 through 105 mounted on an outer surface 101. According to some implementations one or more of the electrical components 102 through 105 are electrically connected by traces and/or plated vias inside the PWB. As will be discussed in more detail below, one or more of the electrical components 102 through 105 is electrically connected to primary and secondary windings of the planar transformer.

The planar transformer 10 includes a core 12 made of a ferromagnetic material. The core 12 incudes a first part **12*a* and a second part 12*b*, with at least one of the first and second parts including a center post 13. As shown in FIG. 3, according to one implementation the center post 13 is cylindrical and forms a part of the second part 12*b* of the core 12**.

Figure 4:
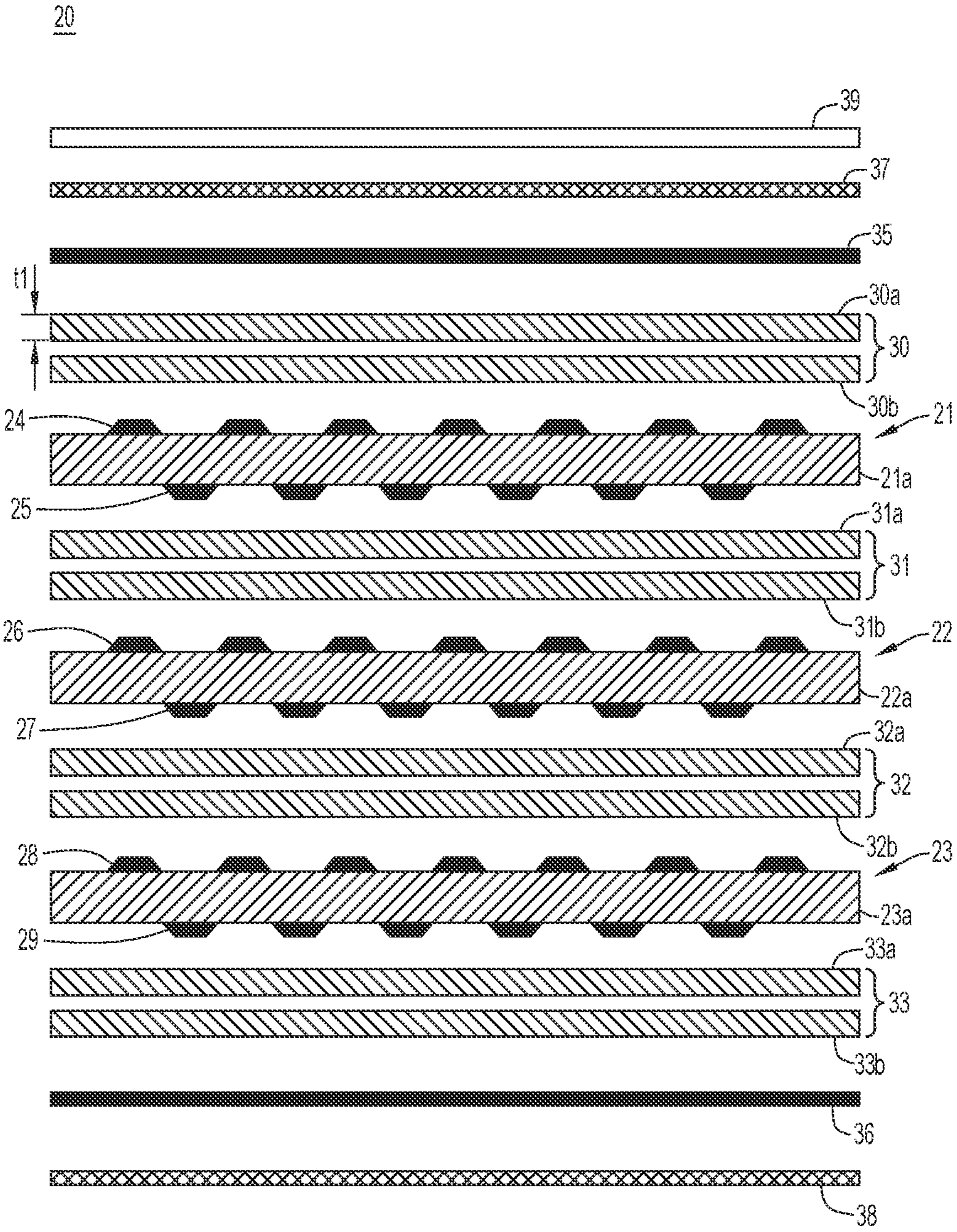
FIG. 4 is a side exploded view of a section of a planar transformer printed wiring board according to one implementation.
Figure 5:
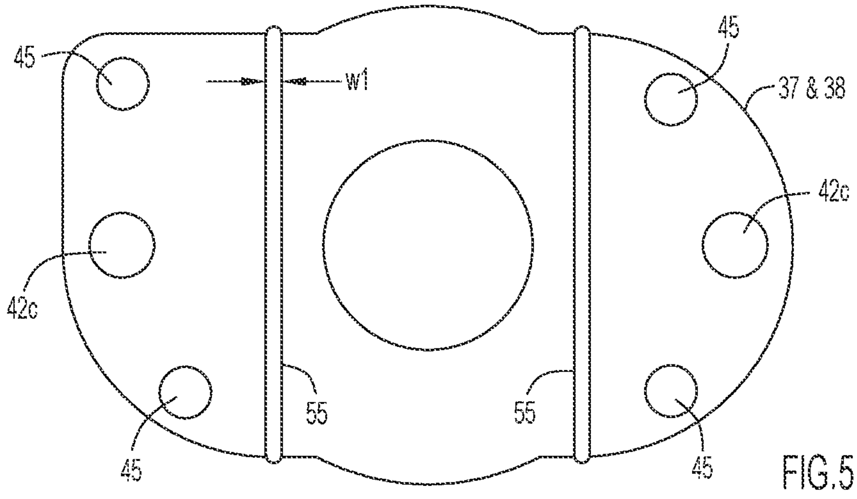
FIG. 5 represents a top view of a top side solder mask of the PWB and/or a bottom view of a bottom side solder mask of the PWB of FIG. 4
Figure 6:
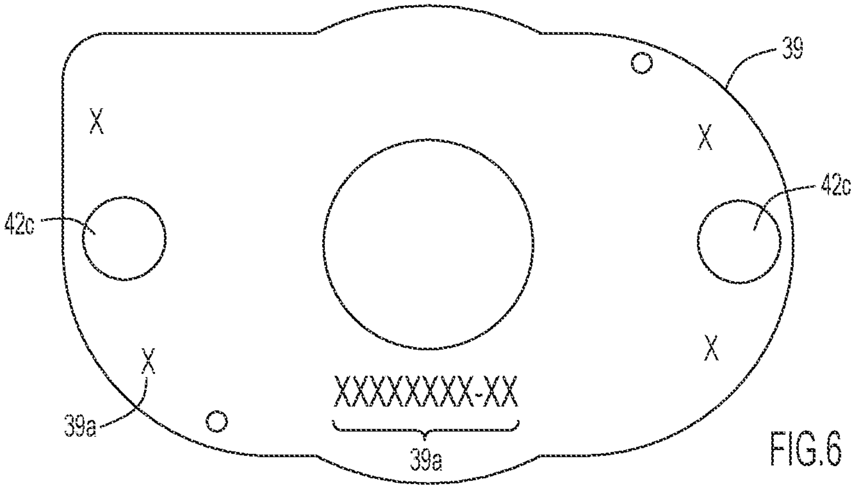
FIG. 6 is a top view of the silk screen layer of the PWB of FIG. 4.

The planar transformer also includes a printed wiring board 20. FIG. 4 is a side exploded view of a section of the planar transformer PWB 20 according to one implementation. The PWB 20 has an aperture 17 in which resides the center post 13 of core 12 when the transformer is in the assembled state. In the implementation of FIG. 4, the PWB 20 is a multilayer board. The exploded view of FIG. 4 is provided to clearly show the various layers of the PWB 20, however, it is appreciated that essentially no gaps exist between the various layers post manufacturing of the PWB. In the description that follows, the PWB 20 is taught to include two groups of primary windings and four groups of secondary windings. It is important to note that the PWB may comprise fewer or a greater number of the primary and secondary windings.

With continued reference to FIG. 4, PWB 20 includes first, second and third laminates 21, 22 and 23 respectively comprising an electrical insulating core **21*a*, 22*a*, 23*a* (epoxy resin in glass fiber) with copper pre-bonded to each side. In the example of FIG. 4, the pre-bonded copper is in the form of windings 24-29 that are created using etching processes during the manufacture of the PWB 20. The winding configurations according to one implementation are shown in FIGS. 8-13. Windings 25 and 28 are primary windings and windings 24, 26, 27 and 29** are secondary windings.

As shown in FIG. 4, each of the first, second and third laminates 21, 22, 23 is sandwiched between a pair of prepreg structures. According to one implementation, each of the prepreg structures 30 through 33 is an electrical insulator that may include multiple prepreg layers. The prepreg layers may comprise, for example, a woven fiberglass cloth with an epoxy resin binder. The use of multiple overlying prepreg layers minimizes or eliminates the existence of pin holes extending through the entirety of the thickness of the prepreg structure: such holes could allow voltage breakdown between conductive layers in the transformer. In the example of FIG. 4, prepreg structure 30 includes first and second prepreg layers **30*a* and 30*b*, prepreg structure 31 includes first and second prepreg layers 31*a* and 31*b*, prepreg structure 32 includes first and second prepreg layers 32*a* and 32*b*, and prepreg structure 33 includes first and second prepreg layers 33*a* and 33*b*. According to one implementation, the prepreg layers have a thickness t1 ranging from 0.002 inches to 0.004 inches, and the overall thickness of the prepreg structures 30 through 33** ranges from 0.004 inches to 0.01 inches.

Figure 7:
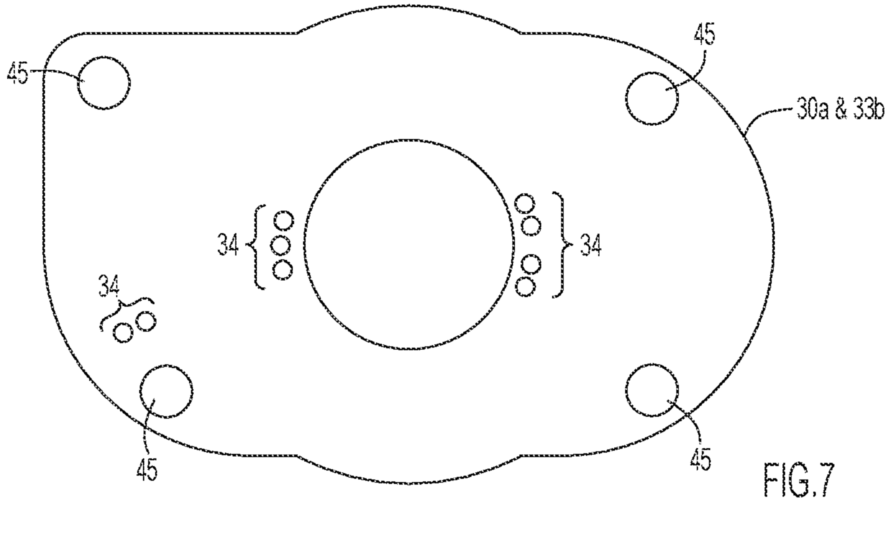
FIG. 7 is a top view of the solder mask layers of the PWB of FIG. 4 according to one implementation.
Figure 8:
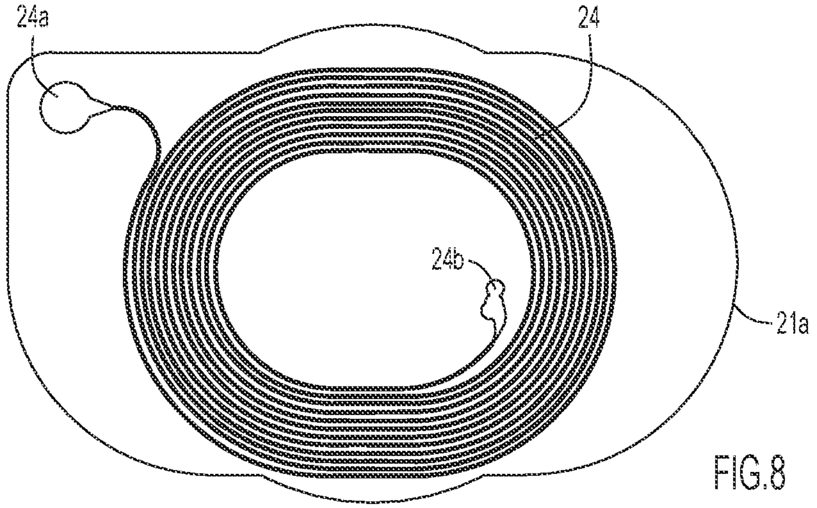
FIG. 8 is a top view of the first group of secondary windings of the PWB of FIG. 4 residing on a first side of a first laminate structure.
Figure 9:
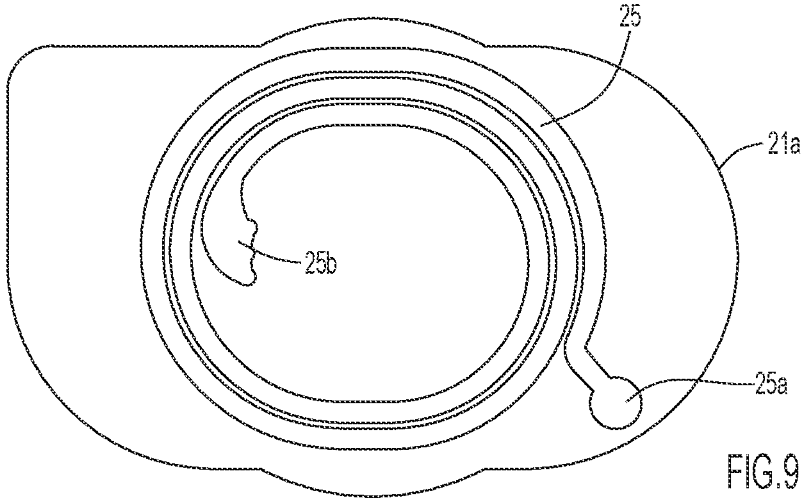
FIG. 9 is a bottom view of the first group of primary windings of the PWB of FIG. 4 residing on a second side of the first laminate structure.
Figure 10:
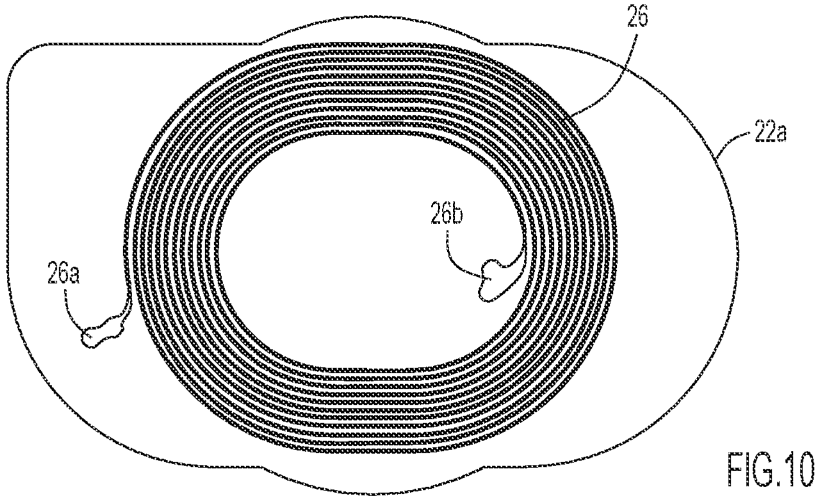
FIG. 10 is a top view of the second group of secondary windings of the PWB of FIG. 4 residing on a first side of a second laminate structure.
Figure 11:
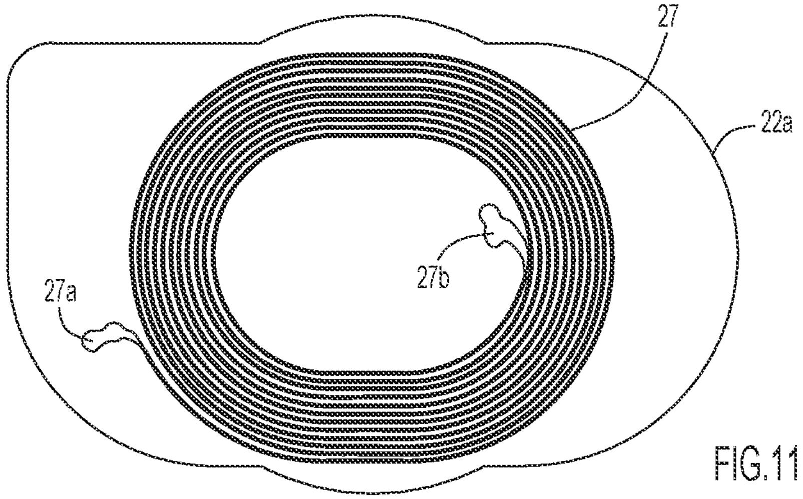
FIG. 11 is a bottom view of the third group of secondary windings of the PWB of FIG. 4 residing on a second side of the second laminate structure.
Figure 12:
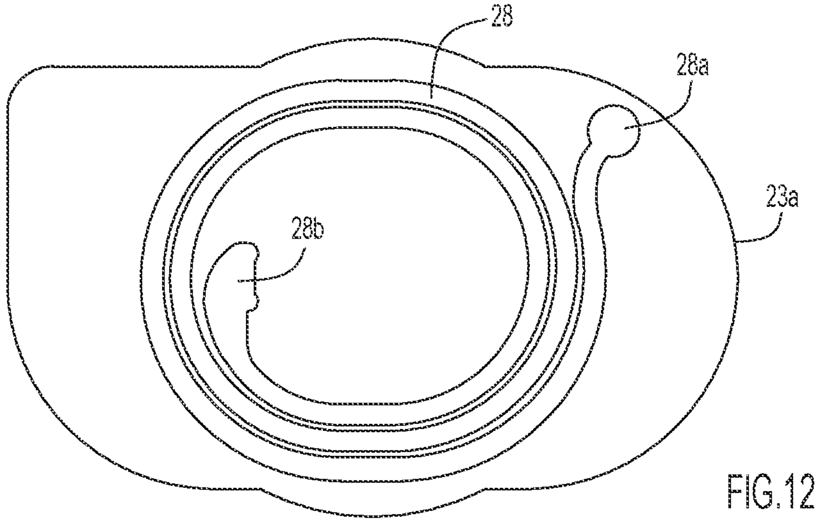
FIG. 12 is a top view of the second group of primary windings of the PWB of FIG. 4 residing on a first side of a third laminate structure.
Figure 13:
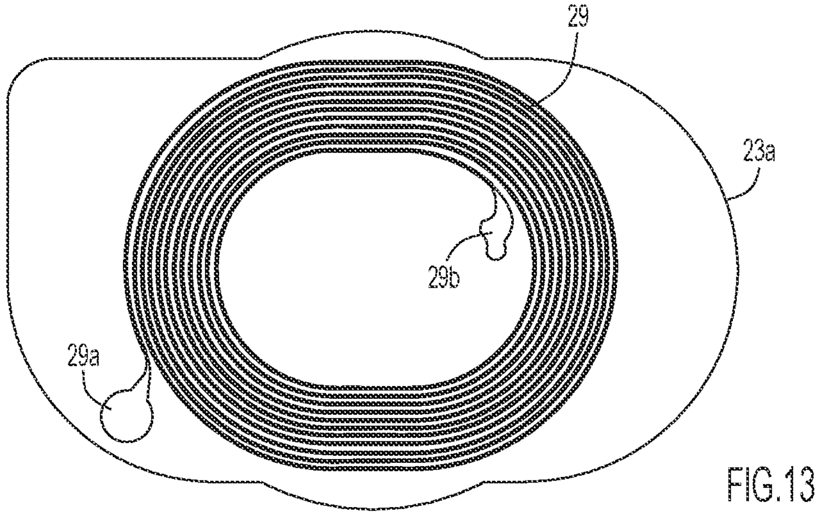
FIG. 13 is a bottom view of the fourth group of secondary windings of the PWB of FIG. 4 residing on the second side of the third laminate structure.

Primary windings 25 includes terminal ends **25*a* and 25*b* and primary windings 28 includes terminal ends 28*a* and 28*b*, with terminal end 25*b* being electrically connected to terminal end 28*b*. Secondary windings 24 includes terminal ends 24*a* and 24*b*, secondary windings 26 includes terminal ends 26*a* and 26*b*, secondary windings 27 includes terminal ends 27*a* and 27*b*, and secondary windings 29 includes terminal ends 29*a* and 29*b*, with terminal end 24*b* being electrically connected to terminal end 26*b*, terminal end 26*a* being electrically connected to terminal end 27*a*, and terminal end 27*b* being electrically connected to terminal end 29*b*. FIG. 7, which is representative of the top surface of prepreg layer 30*a* and also representative of a bottom surface of prepreg layer 33*b*, shows a footprint of the plated through holes 34 that extend through the thickness of the PWB 20 to facilitate the interconnection of the windings as outlined above. Copper foils 35 and 36 shown in FIG. 4 are used in the plating of the through holes 34 and 45 that exist at the top surface of prepreg layer 30***a* and the bottom surface of prepreg layer 33*b*. During the manufacturing of PWB 20, copper foils 35 and 36 are etched and the holes 34 are plated to achieve continuity to the appropriate windings internal to the PWB.

Solder masks 37 and 38 (typically a thin coating of polymer) are respectively applied to the top surface of prepreg layer 30*a* and the bottom surface of prepreg layer 33*b* to maintain the integrity of the copper foil on these surfaces. Portions of the top surface of solder mask 37 may or may not include printed indica 39*a* formed thereon by a silkscreen 39. The silkscreen is a layer of ink traces used to identify components, test points, parts of the PWB, warning symbols, logos and marks etc. The ink is typically a non-conductive epoxy ink.

Turning again to FIGS. 1-3, the planar transformer 10 includes a top surface 20*a* to which the first part of the core 12*a* is attached and a bottom surface 20*b* to which the second part of the core 12*b* is attached. As noted above, the top surface 20*a* (and also the bottom surface) of the PWB 20 comprises a solder mask, According to one implementation, a liquid based adhesive is applied to the first core part 12*a* before bringing it into contact with the top surface 20*a* of PWB 20. The same type of bonding may be carried out with respect to the second core part 12*b* and the bottom surface 20*b* of PWB 20. According to some implementations, once applied and being brought into contact with the surface of the PWB, the liquid based adhesive is solidified using a curing process. As will be discussed in more detail below in reference to FIG. 14, the bonding of the core parts 12*a* and 12*b* to the PWB 20 can be more effectively achieved using pre-form adhesive sheets 50*a* and 50*b*. The use of pre-form adhesive sheets brings with it other advantages as explained below.

After the core 12 has been bonded to PWB 20, the assembly is mechanically connected to circuit board 100 using bolts/screws 40*a* and nuts 40*b* as shown in FIGS. 1 and 2 that extend though apertures 40*c* located in PWB 20 and circuit board 100. According to some implementations, PWB 20 is suspended above the top surface 101 of the circuit board 100 as shown in FIGS. 1 and 2. According to some implementations, the second part 12*b* of the core 12 at least partially resides inside an opening 108 in the circuit board 100 as shown in FIG. 1.

According to some implementations, the PWB 20 is electrically connected to circuit board 100 by pins 44*a-d* that extend through holes 45 in each of the boards. In the implementation of FIGS. 1-13, pins 44*a-d* respectively connect winding terminals 24*a*, 25*a*, 28*a* and 29*a* with electrical conductors (e.g. traces) on or in circuit board 100, that are in turn connected to one or more of the electrical components 102 through 105. An electrically conductive solder dispensed inside the holes 45 and around pins 44*a-d* facilitate a bonding of the pins to the winding terminals and to the conductors of circuit board 100.

An aspect of the planar transformer 10 is the exclusion of windings in areas of the PWB 20 located between prepreg layers 30*a* and 33*b* and the respective first and second parts 12*a*, 12*b* of the core 12. In this manner, prepreg structures 30 and 33 respectively mechanically and electrically isolate the transformer windings from the first and second parts 12*a*, 12*b* of the core 12, and are configured to inhibit an electrical shorting of the transformer windings through the core 12 when the planar transformer 10 is subjected to shock or vibration. In this respect, prepreg structures 30 and 33 are anti-abrasion substrates that inhibit or prevent the core from electrically shorting to the transformer windings during a high g-force shock or vibration event.

As discussed above, the prepreg layers comprise a reinforcing or molding material (such as paper or glass cloth) already impregnated with a synthetic resin (typically epoxy). According to some implementation the prepreg layers comprise a woven fiberglass cloth with an epoxy resin binder. Other compositions are also contemplated, such as, for example, polyimide. According to some implementations the outer prepreg structures 30 and 33 and inner prepreg structures 31 and 32 differ in that the thicknesses of the outer prepreg 30 and 33 structures are greater than the thicknesses of the inner prepreg structures 31 and 32. The composition of the outer prepreg structures 30 and 33 may also different from the composition of the inner prepreg structures 31 and 32. For example, the molding material and or the resin of the inner and outer prepreg structures may differ.

Figure 14:
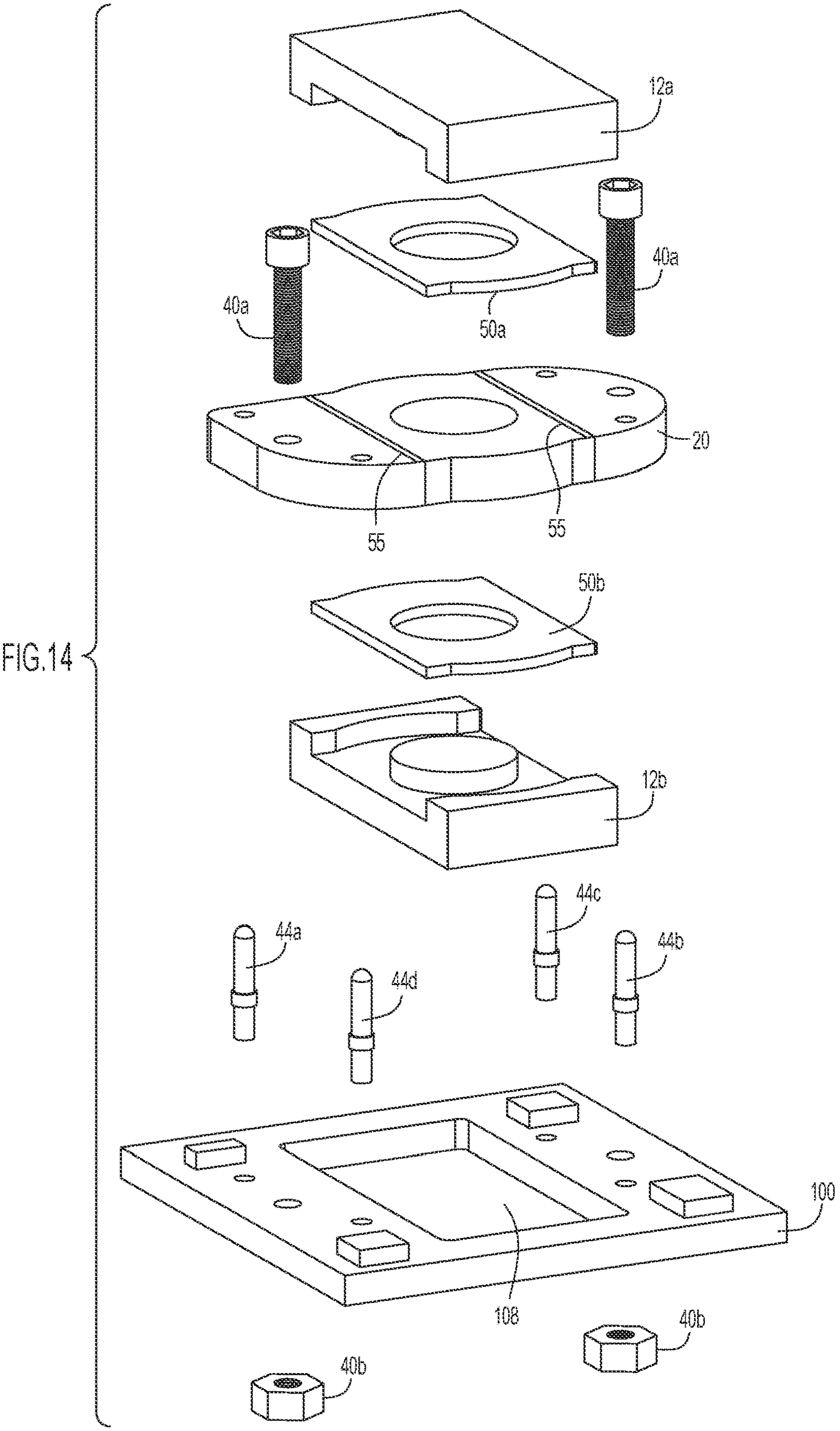
FIG. 14 is an exploded view of a planar transformer that is electrically and mechanically connected to another, separate circuit board.
Figure 15:
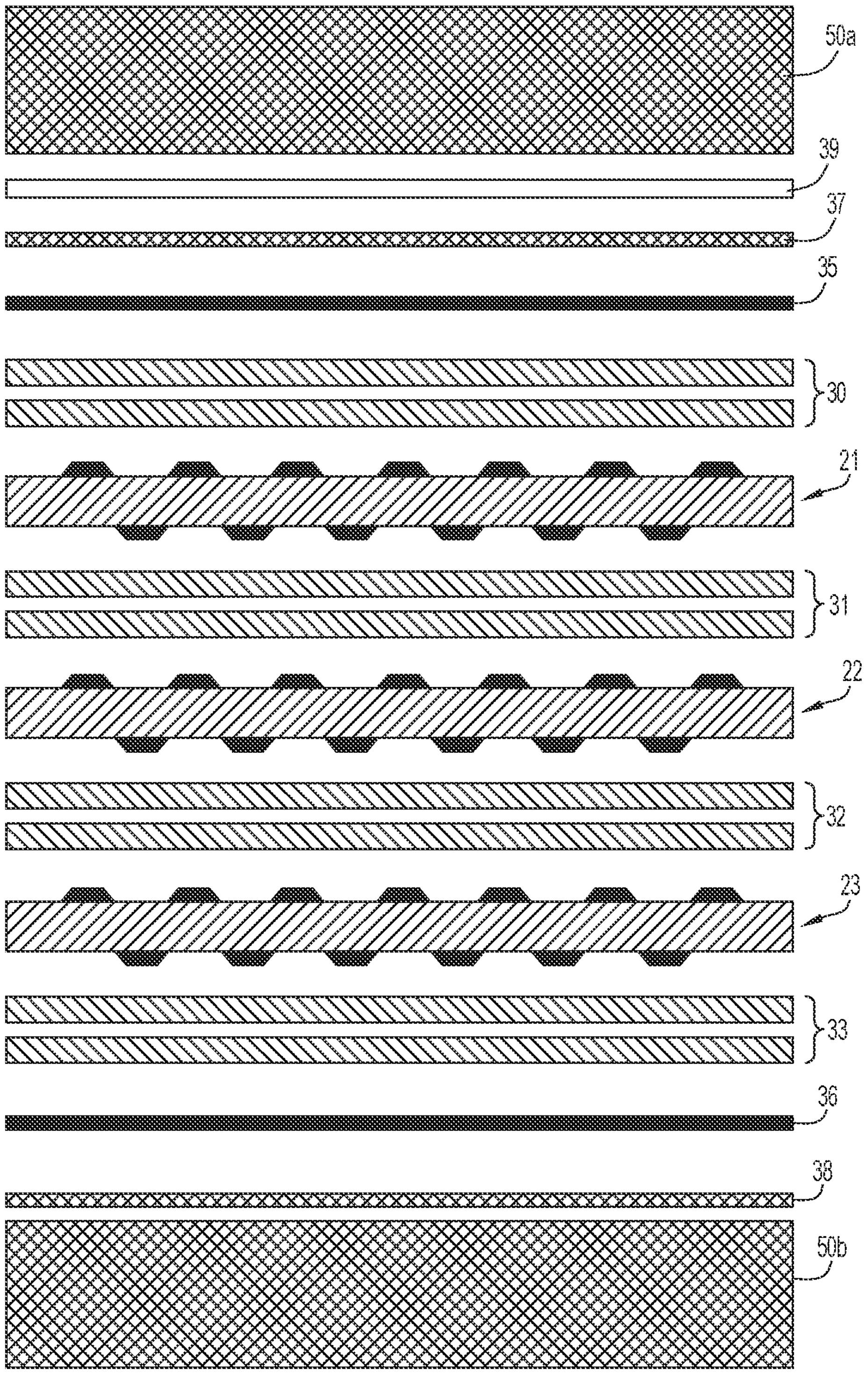
FIG. 15 is a side exploded view of a section of a planar transformer PWB according to one implementation with pre-form adhesive layers bonded to the top and bottom surfaces of the PWB.

FIGS. 14 and 15 depict another implementation wherein pre-form adhesive sheets 50*a* and 50*b* are used to bond the core parts 12*a* and 12*b* to the PWB 20. More particularly, a first pre-form adhesive sheet 50*a* is used to bond the first part of the core 12*a* to primarily the top surface of solder mask 37 (albeit a portion of the top surface of the solder mask 37 may include a layer of ink traces as discussed above). In addition, a second pre-form adhesive sheet 50*b* is used to bond the second part of the core 12*b* to the bottom surface of solder mask 38.

Before being heated, the first and second pre-form adhesive sheets 50*a* and 50*b* may possess some flexibility and are respectively shaped to fit entirely beneath the first and second core parts 12*a* and 12*b* as shown in FIG. 14. When heated, the first and second pre-form adhesive sheets become viscous and bond the first and second parts of the core to the top and bottom surfaces of the PWB, while filling gaps existing between the core and the PWB. During a curing of the pre-form adhesives sheets they beneficially become rigid with little to no flexibility, having a hardness in the Shore D hardness scale at a temperature of 70 degrees Fahrenheit. According to one implementation, the thickness of the first and second pre-form adhesive sheets before being heated is between 0.017 to 0.027 inches and ultimately assumes a thickness of 0.003 inches to 0.026 inches when the adhesive has been fully cured. According to some implementations, the adhesive is a thermoset epoxy having properties that prevent or inhibit the core 12 from making contact with the PWB, or in any event, to prevent the core from making contact with any of the transformer windings when the transformer is subjected to shock or vibration. Like prepreg structures 30 and 33, the pre-form adhesive sheets 50*a* and 50*b* are anti-abrasion substrates that protect against the windings shorting through the core during a high g-force shock or vibration event.

As noted above, the pre-form adhesive sheets are electrically non-conductive, which according to one implementation means that current flow through the thickness of the adhesive sheet is restricted to less than 20 microamperes when 1,500 volts is applied between the primary and secondary windings. In general, the pre-form adhesive sheets are made of a dielectric material through which little to no current may pass under normal operating conditions of the planar transformer.

When each of the top and bottom sides of the PWB comprises a solder mask 37 and 38, according to one implementation, each of the solder masks includes one or more recesses 55 extending across its width (see FIGS. 5 and 14) that at least partially restrict the first and second pre-form adhesive sheets 50*a* and 50*b* from respectively flowing out from under the first and second parts of the core 12*a* and 12*b* when the adhesive pre-forms are heated. This advantageously maintains the adhesive in a region directly under the core parts so that a desired thickness of the adhesive is achieved to enhance the adhesive's effectiveness in guarding against the windings shorting through the core. This also contributes to improving the repeatability of the manufacturing process. According to some implementations, the recesses 55 have a width "w1" of about 0.020 inches to about 0.040 inches and extend partially or entirely through the thickness of the solder masks. According to some implementations, the thickness of solder masks 37 and 38 ranges from 0.0005 inches to 0.0015 inches.

Figure 16:
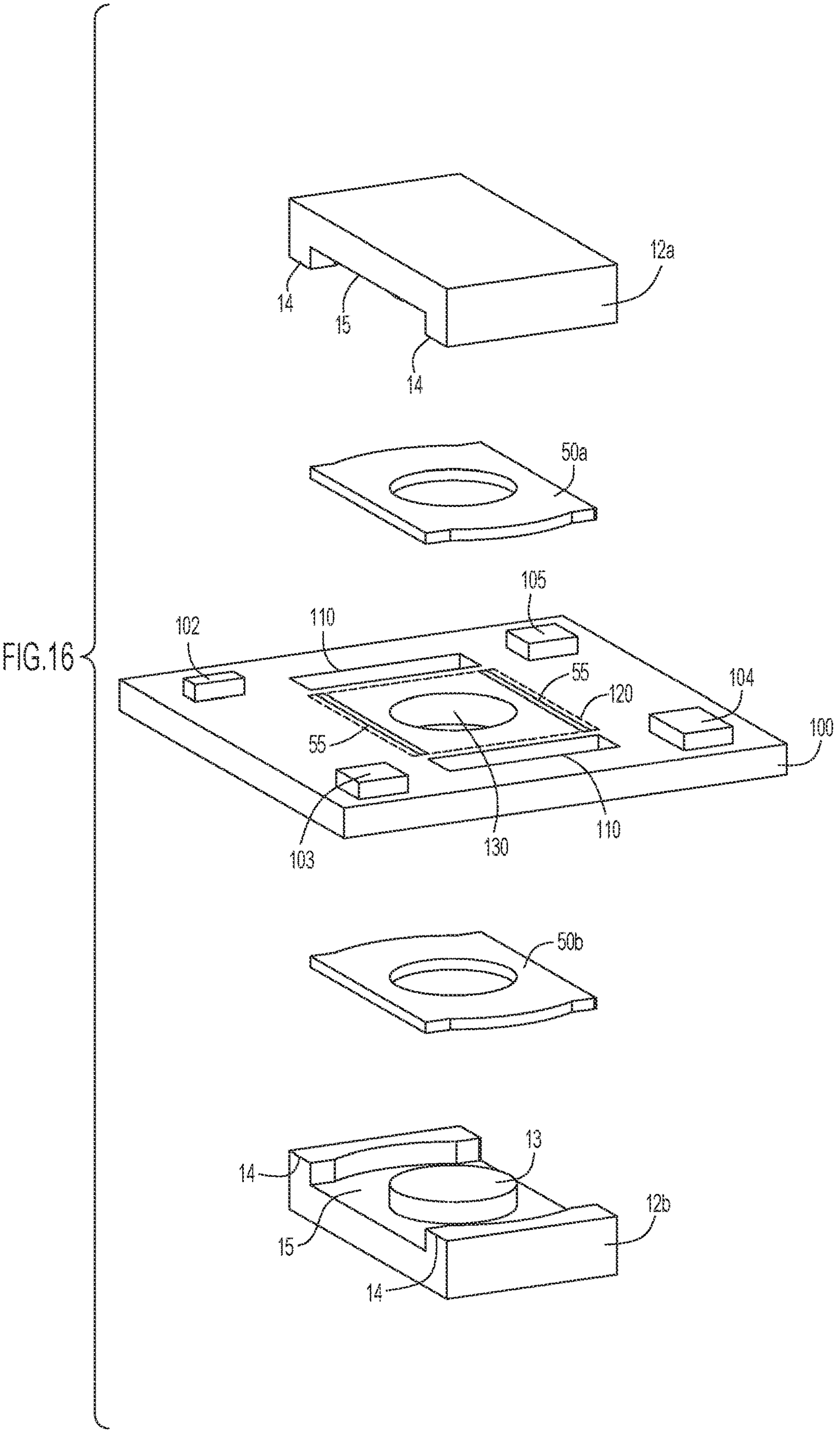
FIG. 16 is an exploded view of an assembly wherein the windings of a planar transformer are integrated into the main circuit board.

In the foregoing disclosure the transformer windings reside in a dedicated PWB 20 that is mechanically and electrically connected to circuit board 100. However, as illustrated in FIG. 16, according to other implementations the elements of PWB 20 (for example, those elements illustrated in FIG. 4) reside inside a region 120 of circuit board 100. According to such implementations, the transformer windings may be electrically connected to one or more of the electrical components 102 through 105 via conductors (e.g. copper traces and vias) located within circuit board 100. In the implementation of FIG. 16, the first and second parts 12*a* and 12*b* of core 12 are bonded to opposite sides of circuit board 100 in region 120 by use of first and second pre-form adhesive sheets 50*a* and 50*b*.

To accommodate the first and second parts 12 and 12*b* of core 12, the electronics board 100 includes a central opening 130 in which the center post 13 resides. Circuit board 100 also includes apertures 110 in which reside the legs 14 of the core parts. This allows the faces 15 of the core parts 12*a* and 12*b* to respectively rest flush against the pre-form adhesives 50*a* and 50*b*.

According to some implementations, the uppermost and lowermost surfaces of circuit board 100 comprise solder masks that each includes recesses 55 that at least partially restrict the first and second pre-form adhesive sheets 50*a* and 50*b* from respectively flowing out from under the first and second parts of the core 12*a* and 12*b* when the adhesive pre-forms are heated. As discussed above, this advantageously maintains the adhesive in a region directly under the core parts so that a desired thickness of the adhesive is achieved to enhance the adhesive's effectiveness in guarding against the windings shorting through the core. This also contributes to improving the repeatability of the manufacturing process. According to some implementations the recesses 55 have a width "w1" of about 0.020 inches to about 0.040 inches and extend partially or entirely through the thickness of the solder masks. According to some implementations, the thickness of the electronics board solder masks ranges from 0.0005 inches to 0.0015 inches.

As evident from the above description, a wide variety of implementations may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A planar transformer comprising:

a core comprising a ferromagnetic material, the core including a first part and a second part, at least one of the first and second parts having a center post;

a printed wiring board having an aperture in which resides the center post, the printed wiring board comprising one or more laminates that each have a first side surface and an opposite second side surface, each of the first and second side surfaces including one of a primary winding and a secondary winding that are magnetically coupled by the core, the primary and secondary windings being electrically independent and surrounding the center post, the printed wiring board having an uppermost primary or secondary winding that is separated from the first part of the core by a first prepreg structure and a lowermost primary or secondary winding that is separated from the second part of the core by a second prepreg structure, each of the first and second prepreg structures comprising multiple prepreg layers, there being no primary or secondary windings disposed between the first prepreg structure and the first part of the core, there being no primary or secondary windings disposed between the second prepreg structure and the second part of the core, the printed wiring board including a first solder mask layer deposited on an uppermost surface of the first prepreg structure and a second solder mask layer deposited on a lowermost surface of the second prepreg structure, the first and second parts of the core being respectively bonded to the first and second solder mask layers;

the first and second parts of the core being respectively bonded to the first and second solder mask layers by a respective first and second pre-form adhesive sheet that each has a hardness in the Shore D hardness scale at a temperature of 70 degrees Fahrenheit;

each of the first and second prepreg structures and each of the first and second pre-form adhesive sheets being configured to inhibit the primary and secondary windings from electrically shorting through the core when the planar transformer is subjected to shock or vibration.

* * * * *